United States Patent
Hu et al.

(10) Patent No.: US 8,774,083 B2
(45) Date of Patent: *Jul. 8, 2014

(54) METHOD AND ARRANGEMENT IN A COMMUNICATION SYSTEM

(75) Inventors: Rong Hu, Beijing (CN); Hai Wang, Beijing (CN)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 1165 days.

This patent is subject to a terminal disclaimer.

(21) Appl. No.: 12/299,501

(22) PCT Filed: May 4, 2006

(86) PCT No.: PCT/SE2006/050101
§ 371 (c)(1),
(2), (4) Date: May 18, 2009

(87) PCT Pub. No.: WO2007/129941
PCT Pub. Date: Nov. 15, 2007

(65) Prior Publication Data
US 2010/0020704 A1 Jan. 28, 2010

(51) Int. Cl.
*H04W 72/04* (2009.01)
(52) U.S. Cl.
USPC .......................................... 370/318; 455/522
(58) Field of Classification Search
CPC ............................................... H04W 72/0406
See application file for complete search history.

(56) References Cited

U.S. PATENT DOCUMENTS

| | | | | |
|---|---|---|---|---|
| 2002/0160767 A1* | 10/2002 | Hanly | ........................... | 455/422 |
| 2003/0185159 A1* | 10/2003 | Seo et al. | ...................... | 370/278 |
| 2005/0135497 A1* | 6/2005 | Kim et al. | ..................... | 375/267 |
| 2006/0274712 A1* | 12/2006 | Malladi et al. | ................ | 370/345 |
| 2008/0153494 A1* | 6/2008 | Kazmi et al. | .................. | 455/436 |

* cited by examiner

*Primary Examiner* — Jianye Wu

(57) ABSTRACT

The invention relates to a method and an arrangement for obtaining efficient radio resource utilization in a communication network comprising a communication network entity transmitting data on a downlink channel over a radio interface to one or more user equipment, each of which is transmitting data on an uplink channel to said communication network entity over said radio interface. The communication network entity receives transmit power control (TPC) commands on said uplink channel and, further, monitors a channel quality indicator (CQI) on said uplink channel from said user equipment in order to obtain channel quality indicator measurements. If there is a channel quality indicator available, the communication network entity calculates a required downlink power. Otherwise, the communication network entity decodes said received transmit power control commands. Thereafter said transmission power is adjusted either based on the calculated downlink power or based on the decoded transmit power control commands in order to obtain efficient radio resource utilization.

12 Claims, 2 Drawing Sheets

METHOD AND ARRANGEMENT IN A COMMUNICATION SYSTEM

TECHNICAL FIELD

The present invention relates to a method and an arrangement in a communication system, and in particular to a method and an arrangement for obtaining efficient radio resource utilization. The invention further relates to a computer-readable medium containing computer program for obtaining efficient radio resource utilization.

BACKGROUND OF THE INVENTION

The invention relates to a High Speed Downlink Packet Access (HSDPA) system and it addresses a method of improving F-DPCH power control performance.

In the Third generation Partnership Project (3GPP) Rel6, a new channel is introduced, F-DPCH (Fractional-Dedicated Physical Channel). The only information sent on the F-DPCH is two transmission power control (TPC) command bits per slot, with spreading factor 256. The downlink power control, for the F-DPCH, can be divided into an inner loop and an outer loop. The outer loop controls the downlink quality in terms of TPC command error rate (CER), by providing signal to interference ratio (SIR) references to the inner loop. The inner loop controls the SIR by sending transmission power control (TPC) commands to the base station. The TPC bits carried on the downlink F-DPCH controls the power transmitted in the uplink and thus the uplink performance. It is therefore essential that enough power is used on the downlink F-DPCH so that the TPC bits are correctly received by a user equipment (UE).

The performance of the SIR estimator and the CER estimator directly impacts the quality of the downlink F-DPCH and therefore indirectly the quality of the uplink channels. Measurement of the CER is not straight forward as there are no traditional pilot bits. This means that there is a need for a method to estimate the CER based on received TPC symbols.

There are a number of known methods for estimating the CER:

1) Based on predefined TPC bits, which simplifies CER estimation considerably, but requires a standard change;
2) Based on SIR estimate, where the mapping between the estimated SIR and the CER is relatively channel independent and which require SIR estimates with high accuracy;
3) By comparing TPC bits, where the mapping between the probability of unequal bits to CER is relatively channel independent; which requires estimating the probability of unequal bits with high accuracy;
4) By considering the ratio of statistical moments of received TPC amplitudes distribution, where the mapping between the statistical moments to CER is relatively channel independent; which is very much dependent on the accuracy of statistical moments.

All the above methods only focus on the UE side to do the F-DPCH power control and to improve the CER estimation accuracy. However, when the UE side controls the downlink power control, there might be an impact on the downlink channel of a bad UE, e.g. some bad user equipment could send "UP" commands with high probability and thus wasting valuable radio resources.

SUMMARY OF THE INVENTION

Accordingly, it is an objective with the present invention to provide an improved method for obtaining efficient radio resource utilization in a communication network comprising a communication network entity transmitting data on a downlink channel over a radio interface to one or more user equipment each of which is transmitting data on an uplink channel to said communication network entity over said radio interface.

A further objective with the present invention is to provide an improved arrangement for obtaining efficient radio resource utilization in a communication network comprising a communication network entity transmitting data on a downlink channel over a radio interface to one or more user equipment, each of which is transmitting data on an uplink channel to said communication network entity over said radio interface.

A still further objective with the present invention is to provide an improved computer-readable medium for obtaining efficient radio resource utilization in a communication network comprising a communication network entity transmitting data on a downlink channel over a radio interface to one or more user equipment, each of which is transmitting data on an uplink channel to said communication network entity over said radio interface.

Further embodiments are listed in the dependent claims.

Thanks to the provision of a method and an arrangement which involve the network side into the power control, a faster converge to the steady state is obtained and the impact on the downlink channel of a bad user equipment is reduced. Further, the inventive method and arrangement requires no standard change.

Still other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF PREFERRED EMBODIMENTS

Figure 1:
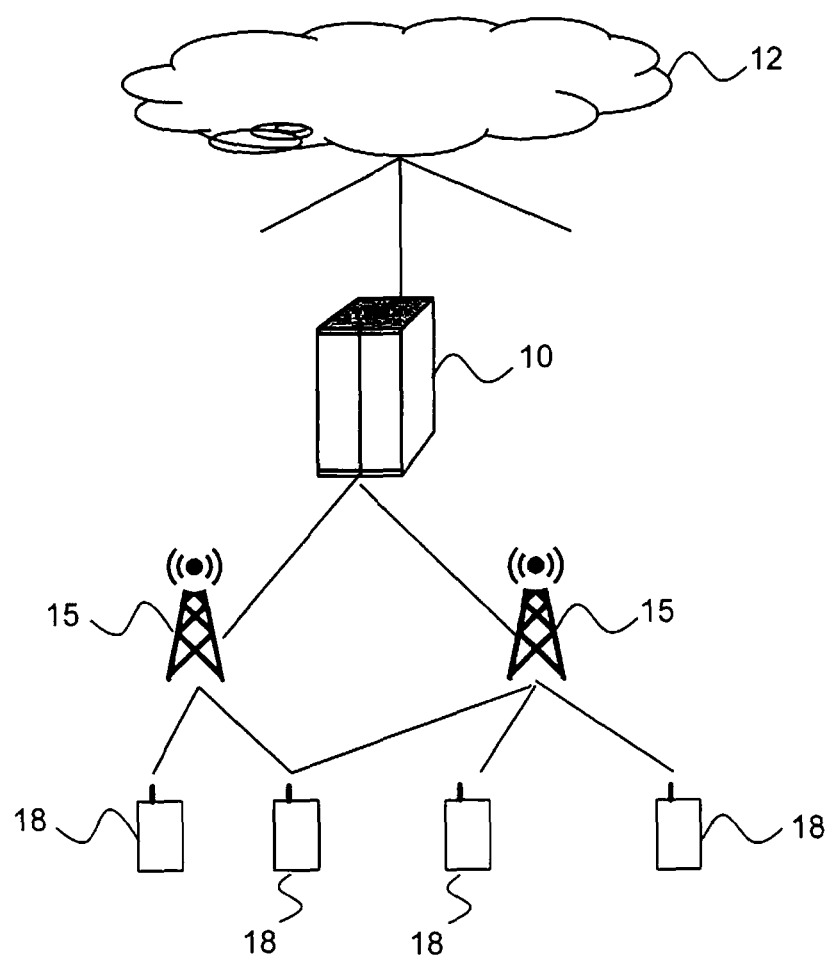
FIG. 1 shows the communication network architecture according to the present invention.

FIG. 1 depicts a communication system such as a CDMA communication system including a Radio Access Network (RAN), such as the UMTS Terrestrial Radio Access Network (UTRAN) architecture, comprising at least one Radio Base Station (RBS) (or Node B) 15 (two are shown in FIG. 1) connected to one or more Radio Network Controllers (RNCs) 10. The RAN is connected to a Core network (CN) 12. The RAN and the CN 12 provide communication and control for a plurality of user equipment (UE) 18. The present invention involves the network side into the downlink power control and, especially, on the F-DPCH channel.

Figure 2:
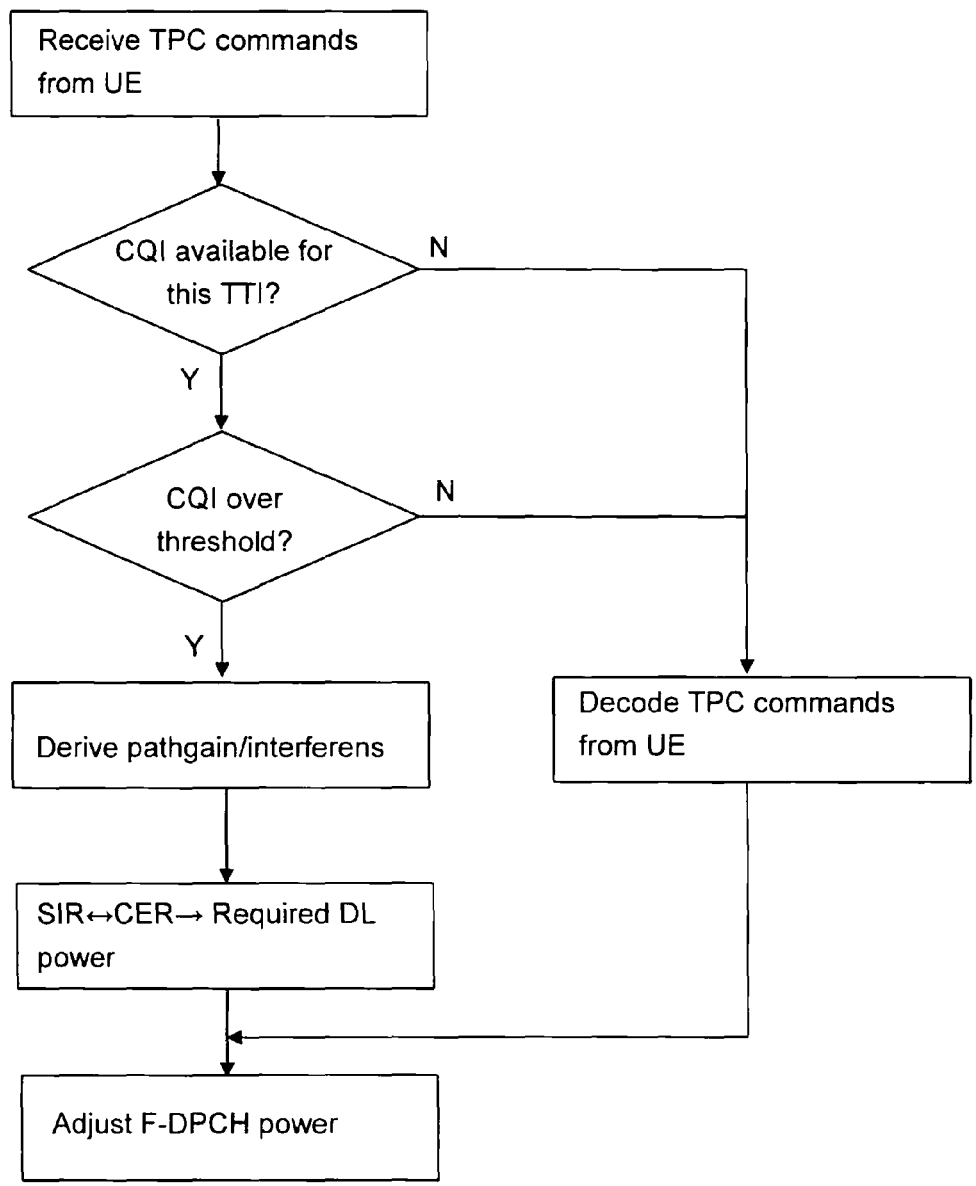
FIG. 2 shows a flow chart over the inventive method.

In a preferred embodiment of the present invention, the procedure in a communication network for obtaining efficient radio resource utilization in a communication network comprising a communication network entity 15 transmitting data on a downlink channel over a radio interface to one or more user equipment 18, each of which is transmitting data on an uplink channel to said communication network entity 15 over said radio interface, shown in FIG. 2, is as follows:

1) Node B 15 receives TPC commands from the UE 18 on the uplink channel;

2) Node B 15 monitors a channel quality indicator (CQI) on the uplink channel from the UE 18 in order to obtain channel quality indicator measurements, i.e. monitoring whether the specific TTI comprises a CQI;

3) If there is a channel quality indicator available, the channel quality indicator measurements is compared with a pre-defined threshold value, because the CQI estimation or reporting could be bad and it would be better to use the normal F-DPCH power control;

4) If said channel quality indicator measurements precedes said threshold value, Node B 15 calculates a required downlink power by utilizing the received CQI to derive the ratio between the path gain, g, and the interference, I, (here the interference actually includes the interference and the thermal noise);

5) Radio Network Controllers (RNCs) 10 signals the target F-DPCH CER, ($CER_{target}$) to the UE 18. By mapping the CER to the SIR, the required F-DPCH SIR ($SIR_{required}$) can be obtained at NodeB. Then the required F-DPCH transmission downlink power, $P_{tx}$, can be obtained, see Equations (1), (2) and (3) below, $$CER_{target} \rightarrow SIR_{required} \quad (1)$$

$$SIR_{required} = P_{tx} \cdot \frac{g}{I} \quad (2)$$

$$P_{tx} = SIR_{required} / \left(\frac{g}{I}\right) \quad (3)$$

6) The transmission power, i.e. the F-DPCH transmission power, is adjusted based on the calculated downlink power in order to obtain efficient radio resource utilization;

7) Since the CQI reporting could not be available every TTI, the inventive, above described, method is combined with the normal F-DPCH power control. i.e., if there is a CQI feedback, the F-DPCH power is adjusted to the power level obtained from the inventive method. Otherwise, NodeB 15 may obey the TPC commands from the UE, i.e. decoding the received transmit power control commands and adjusting transmission power based on the decoded transmit power control commands in order to obtain efficient radio resource utilization.

Accordingly, an inventive arrangement for obtaining efficient radio resource utilization in a communication network, such as a CDMA communication system, comprising a communication network entity 15 transmitting data on a downlink channel over a radio interface to one or more user equipment 18, each of which is transmitting data on an uplink channel to said communication network entity 15 over said radio interface, comprises:

1) means for receiving transmit power control (TPC) commands on said uplink channel;

2) means for monitoring a channel quality indicator (CQI) on said uplink channel from said user equipment in order to obtain channel quality indicator measurements;

3) means for comparing said channel quality indicator measurements with a pre-defined threshold value;

4) means for deriving a ratio between a path gain value and an interference value from said channel quality indicator measurements;

5) means for mapping the target command error rate (CER) to the signal-to-interference ratio (SIR) in order to obtain a required signal-to-interference ratio (SIR)

6) means for calculating a required downlink power, preferably on the F-DPCH channel, arranged to derive a ratio between a required signal-to-interference ratio (SIR) and said ratio between said path gain value and said interference value;

7) means for decoding said received transmit power control commands;

8) means for adjusting transmission power arranged to adjust said transmission power based on the calculated downlink power in order to obtain efficient radio resource utilization if there is a channel quality indicator available and if said channel quality indicator measurements precedes said threshold value and, otherwise, based on the decoded transmit power control commands in order to obtain efficient radio resource utilization.

It will be appreciated that at least some of the procedures described above are carried out repetitively as necessary to respond to the time-varying characteristics of the channel between the transmitter and the receiver. To facilitate understanding, many aspects of the invention are described in terms of sequences of actions to be performed by, for example, elements of a programmable computer system. It will be recognized that the various actions could be performed by specialized circuits (e.g. discrete logic gates interconnected to perform a specialized function or application-specific integrated circuits), by program instructions executed by one or more processors, or a combination of both.

Moreover, the invention can additionally be considered to be embodied entirely within any form of computer-readable storage medium having stored therein an appropriate set of instructions for use by or in connection with an instruction-execution system, apparatus or device, such as computer-based system, processor-containing system, or other system that can fetch instructions from a medium and execute the instructions. As used here, a "computer-readable medium" can be any means that can contain, store, communicate, propagate, or transport the program for use by or in connection with the instruction-execution system, apparatus or device. The computer-readable medium can be, for example but not limited to, an electronic, magnetic, optical, electromagnetic, infrared, or semiconductor system, apparatus, device or propagation medium. More specific examples (a non-exhaustive list) of the computer-readable medium include an electrical connection having one or more wires, a portable computer diskette, a random access memory (RAM), a read only memory (ROM), an erasable programmable read only memory (EPROM or Flash memory), an optical fibre, and a portable compact disc read only memory (CD-ROM).

Thus, a computer-readable medium containing computer program according to a preferred embodiment of the present invention for obtaining efficient radio resource utilization in a communication network comprising a communication network entity 15 transmitting data on a downlink channel over a radio interface to one or more user equipment 18, each of which is transmitting data on an uplink channel to said communication network entity (15) over said radio interface, is provided wherein the computer program performs the steps of:

receiving transmit power control (TPC) commands on said uplink channel;

monitoring a channel quality indicator (CQI) on said uplink channel from said user equipment in order to obtain channel quality indicator measurements;

if there is a channel quality indicator available, comparing said channel quality indicator measurements with a pre-defined threshold value;

if said channel quality indicator measurements precedes said threshold value, calculating a required downlink power and adjusting transmission power based on the calculated downlink power in order to obtain efficient radio resource utilization;

otherwise, decoding said received transmit power control commands and adjusting transmission power based on the decoded transmit power control commands in order to obtain efficient radio resource utilization.

Modifications to embodiments of the invention described in the foregoing are possible without departing from the scope of the invention as defined by the accompanying claims.

Expressions such as "including", "comprising", "incorporating", "consisting of", "have", "is" used to describe and claim the present invention are intended to be construed in a non-exclusive manner, namely allowing for items, components or elements not explicitly described also to be present. Reference to the singular is also to be construed to relate to the plural and vice versa.

Numerals included within parentheses in the accompanying claims are intended to assist understanding of the claims and should not be construed in any way to limit subject matter claimed by these claims.

The invention claimed is:

1. A method for obtaining efficient radio resource utilization in a communication network comprising a communication network entity transmitting data on a downlink channel over a radio interface to one or more user equipment, each of which transmits data on an uplink channel to said communication network entity over said radio interface, said method comprising the steps of:
   receiving, at a Node B, transmit power control commands on said uplink channel, from a user equipment;
   monitoring, at the Node B, a channel quality indicator on said uplink channel from said user equipment in order to obtain channel quality indicator measurements;
   if there is a channel quality indicator available, comparing, at the Node B, said channel quality indicator measurements with a pre-defined threshold value; and,
   if said channel quality indicator measurements precedes said threshold value, calculating, at the Node B, a required downlink power and adjusting transmission power based on the calculated downlink power in order to obtain efficient radio resource utilization;
   otherwise, decoding, at the Node B, said received transmit power control commands and adjusting transmission power based on the decoded transmit power control commands in order to obtain efficient radio resource utilization.

2. The method according to claim 1, wherein said channel quality indicator measurements is obtained by deriving a ratio between a path gain value and an interference value.

3. The method according to claim 2, wherein said required downlink power is calculated by deriving a ratio between a required signal-to-interference ratio and said ratio between said path gain value and said interference value.

4. The method according to claim 3, wherein said required signal-to-interference ratio is obtained by mapping the target command error rate to the signal-to-interference ratio.

5. An apparatus for obtaining efficient radio resource utilization in a communication network comprising a communication network entity that transmits data on a downlink channel over a radio interface to one or more user equipment, each of which transmits data on an uplink channel to said communication network entity over said radio interface, wherein the arrangement comprises:
   means for receiving, at a Node B, transmit power control commands on said uplink channel, from a user equipment;
   means for monitoring, at the Node B, a channel quality indicator on said uplink channel from said user equipment in order to obtain channel quality indicator measurements;
   means for comparing, at the Node B, said channel quality indicator measurements with a pre-defined threshold value;
   means for calculating, at the Node B, a required downlink power;
   means for decoding, at the Node B, said received transmit power control commands: and,
   means for adjusting, at the Node B, transmission power based on the calculated downlink power in order to obtain efficient radio resource utilization if there is a channel quality indicator available and if said channel quality indicator measurements precedes said threshold value and, otherwise, based on the decoded transmit power control commands in order to obtain efficient radio resource utilization.

6. The apparatus according to claim 5, further comprising means for deriving a ratio between a path gain value and an interference value from said channel quality indicator measurements.

7. The apparatus according to claim 6, further comprising means for deriving a ratio between a required signal-to-interference ratio and said ratio between said path gain value and said interference value from which said required downlink power is calculated.

8. The apparatus according to claim 7, further comprising comprises means for mapping the target command error rate to the signal-to-interference ratio in order to obtain said required signal-to-interference ratio.

9. The apparatus according to claim 5, wherein the downlink channel is a Fractional Dedicated Physical Channel.

10. The apparatus according to claim 5, wherein said communication network is a Code Division Multiple Access communication network.

11. The apparatus according to claim 5, wherein said communication network entity is a radio base station.

12. A non-transitory computer-readable medium containing computer program for obtaining efficient radio resource utilization in a communication network comprising a communication network entity that transmits data on a downlink channel over a radio interface to one or more user equipment, each of which transmits data on an uplink channel to said communication network entity over said radio interface, wherein the computer program performs the steps of:
   receiving, at a Node B, transmit power control commands on said uplink channel, from a user equipment;
   monitoring, at the Node B, a channel quality indicator on said uplink channel from said user equipment in order to obtain channel quality indicator measurements;
   if there is a channel quality indicator available, comparing, at the Node B, said channel quality indicator measurements with a pre-defined threshold value; and,
   if said channel quality indicator measurements precedes said threshold value, calculating, at the Node B, a required downlink power and adjusting transmission power based on the calculated downlink power in order to obtain efficient radio resource utilization;
   otherwise, decoding, at the Node B, said received transmit power control commands and adjusting transmission power based on the decoded transmit power control commands in order to obtain efficient radio resource utilization.

* * * * *

UNITED STATES PATENT AND TRADEMARK OFFICE
CERTIFICATE OF CORRECTION

| | | |
|---|---|---|
| PATENT NO. | : 8,774,083 B2 | Page 1 of 1 |
| APPLICATION NO. | : 12/299501 | |
| DATED | : July 8, 2014 | |
| INVENTOR(S) | : Hu et al. | |

It is certified that error appears in the above-identified patent and that said Letters Patent is hereby corrected as shown below:

In the Specification

In Column 3, Line 42, delete "control." and insert -- control, --, therefor.

In the Claims

In Column 6, Lines 30-31, in Claim 8, delete "comprising comprises" and insert -- comprising --, therefor.

Signed and Sealed this
Twentieth Day of January, 2015

Michelle K. Lee
*Deputy Director of the United States Patent and Trademark Office*